United States Patent [19]
Okuyama et al.

[11] 3,949,283
[45] Apr. 6, 1976

[54] CONTROL SYSTEM FOR BRUSHLESS MOTOR

[75] Inventors: Toshiaki Okuyama; Hiroyuki Okamoto, both of Hitachi; Takamasa Hori; Hiroshi Hayashida, both of Ibaraki; Mitsuyuki Honbu, Hitachi, all of Japan

[73] Assignee: Hitachi, Ltd., Japan

[22] Filed: Feb. 15, 1974

[21] Appl. No.: 443,141

[30] Foreign Application Priority Data
Feb. 16, 1973 Japan............................ 48-18264

[52] U.S. Cl. .............. 318/138; 318/171; 318/227; 318/230
[51] Int. Cl.² ...................................... H02K 29/00
[58] Field of Search .......... 318/138, 171, 227, 230, 318/231

[56] References Cited
UNITED STATES PATENTS
3,696,278   10/1972   Kuniyoshi et al.................. 318/138

*Primary Examiner*—Gene Z. Rubinson
*Attorney, Agent, or Firm*—Craig & Antonelli

[57] ABSTRACT

A control system for a brushless motor is disclosed which comprises an AC power supply, a rectifier circuit including controlled rectifier elements for converting the alternating current supplied by the AC power supply into a direct current, an inverter circuit including controlled rectifier elements for converting the direct current produced by the rectifier circuit into an alternating current, a motor driven by the inverter circuit and a position detector for detecting a signal representing rotational positions of the motor. The controlled rectifier elements of the inverter circuit are fired in predetermined sequence in response to detection signals from the position detector, while the DC output current of the rectifier is continually controlled at each commutation of the inverter circuit at low motor speeds. A predetermined number of signals in synchronism with each commutation of the inverter circuit are included in one cycle, so that the DC output current of the rectifier circuit is controlled for continual operation by the use of signals with different delay times behind the aforementioned signals concurrent with the commutation of the inverter.

5 Claims, 11 Drawing Figures

3,949,283

CONTROL SYSTEM FOR BRUSHLESS MOTOR

BACKGROUND OF THE INVENTION

1. Field of the Invention

This invention relates to control systems for commutatorless motors.

2. Description of the Prior Art

The brushless or commutatorless motor is a variable speed motor without any commutator consisting of a combination of a synchronous motor and a power converter including controlled rectifier elements and has the advantages that 1. any desired speeds are obtained ranging from zero to the synchronous speed or higher, resulting in a very wide range of speed control, 2. the absence of any brush or commutator facilitates the maintenance and inspection thereof, 3. and reversible drive and regenerative braking are easily effected.

The power converter of the commutatorless motor is of two types: One is the cycloconverter type which employs a cycloconverter for converting an AC source voltage directly into an AC voltage of variable frequency and variable voltage, and the other is the DC link type which uses an inverter circuit whereby the AC voltage from the AC power supply is converted first into a variable DC voltage through rectifier circuit and then converted into a variable frequency AC voltage.

The power converter such as mentioned above for the commutatorless motor, which has no forced commutation circuit for commutation of the controlled rectifier elements, effects commutation of the controlled rectifier elements by taking advantage of the induced voltage produced in the armature winding of the synchronous motor. However, in view of the fact that a sufficiently high voltage to effect commutation is not induced in the armature winding of the synchronous motor at low speeds of the motor such as when the motor has just started, a commutation failure may occur in the power converter of DC link type. As to the cycloconverter type of the power converter, by contrast, no problem of the commutation failure is caused since it utilizes an AC source voltage for commutation.

As a result, in the commutatorless motor of DC link type, the rectifier circuit is subjected to inversion at each commutation of inverter circuit at low motor speeds so that the DC output current is reduced to zero thereby to assure the successful commutation of the inverter circuit. In the abovementioned case where the DC output current of the rectifier circuit is continually controlled at each commutation of the inverter circuit at low speeds of the synchronous motor, the DC portion is superimposed on the AC source current at certain frequencies, i.e. 50/6 and 50/12 cycles of the operating frequency of the synchronous motor, with the result that the DC excitation in the transformer core interposed between the AC power supply and the rectifier circuit is affected or distorted by the DC portion. The foregoing description is based on the assumption that the frequency of the AC power supply is 50 cycles.

This effect of the direct current excitation in the transformer core often causes the overheating of the transformer or breakdown thereof under heat or unwanted noises due to an increased temperature and exciting current. Therefore, it is very important to prevent the DC portion from being superimposed on the AC source current.

SUMMARY OF THE INVENTION

Accordingly, it is an object of the invention to provide a control system for the brushless motor of DC input type which is capable of preventing or reducing the superimposition of the DC portion on the AC source current and thereby protecting the transformer from an overheated condition or breakdown under heat.

According to the invention, there is provided a control system for a brushless motor in which the DC output of the rectifier circuit comprising a plurality of controlled rectifiers is continually controlled at each commutation of the inverter circuit including a plurality of controlled rectifiers at low motor speeds; the control system comprising first means for detecting signals representing the rotational positions of the motor, second means for firing the controlled recrifiers of the inverter circuit in a predetermined order in response to detection signals from first means, third means for generating signals in synchronism with each commutation of the inverter circuit in response to the output signal from second means and also generating delay signals having different delay times with respect to the synchronizing signals included in one cycle comprising a predetermined number of the synchronizing signals, fourth means for reducing to zero the DC output current of the rectifier circuit in response to an output signal from third means.

DESCRIPTION OF THE PREFERRED EMBODIMENTS

Figure 1:
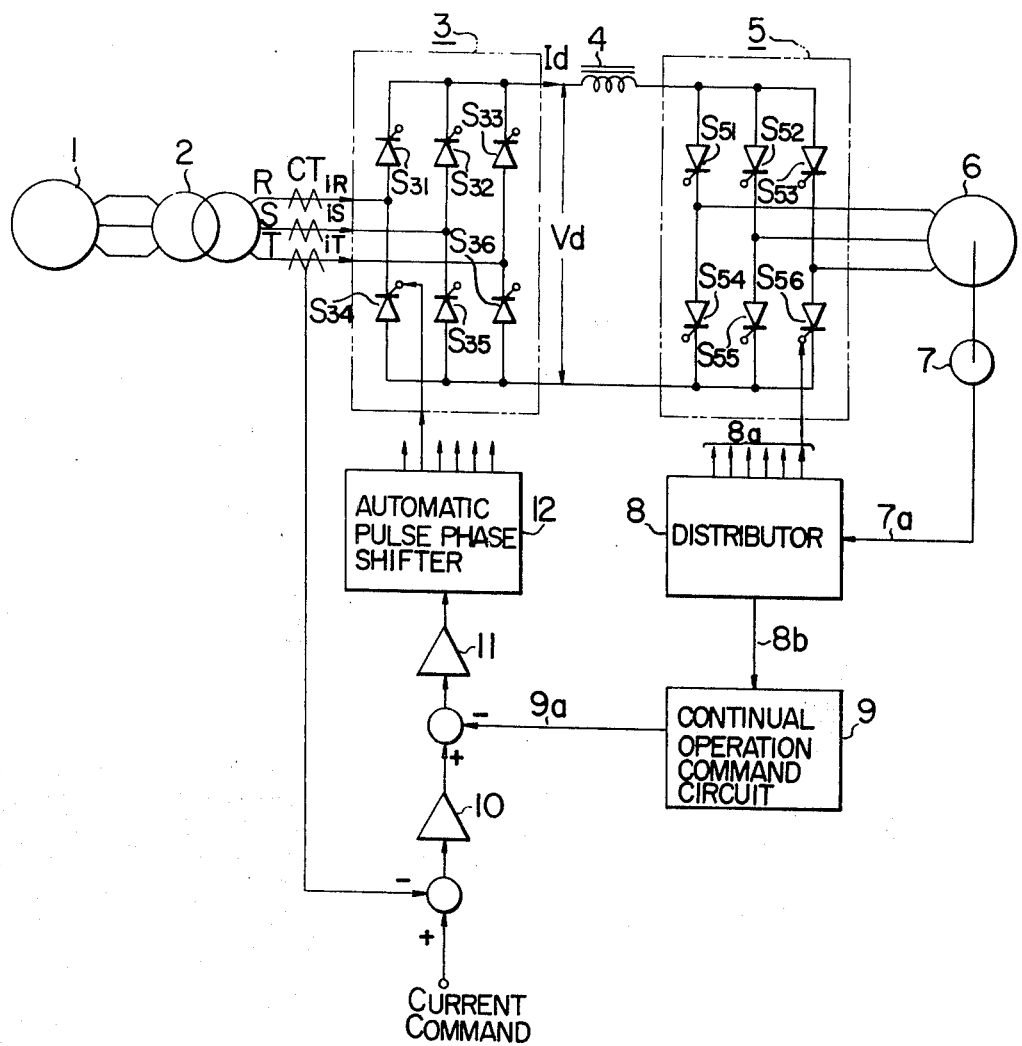
FIG. 1 is a diagram showing a circuit arrangement of a commutatorless motor.

The circuit arrangement and operation of the commutatorless motor will be explained with reference to FIGS. 1 to 3. First referring to FIG. 1, reference numeral 1 shows a three-phase AC power supply, numeral 2 a transformer with its primary winding connected to the three-phase power supply, numeral 3 a rectifier circuit comprising thyristors $S_{31}$ to $S_{36}$ connected in the form of a bridge connected to the secondary winding of the transformer 2 for converting the AC voltage of the three-phase power supply 1 into a variable DC voltage, numeral 4 a DC reactor for smoothing the pulsating DC output current of the rectifier circuit 3, numeral 5 an inverter circuit comprising thyristors $S_{51}$ to $S_{56}$ connected in bridge for converting the DC output voltage of the rectifier circuit 3 into a variable frequency AC voltage, and numeral 6 a synchronous motor driven by the inverter circuit 5 which has a terminal voltage depending on the magnitude of the output voltage of the inverter circuit 5 and hence that of the rectifier circuit 3, while its operating frequency is determined by the output frequency of the inverter circuit 5. Numeral 7 shows a position detector coupled directly to the rotary shaft of the synchronous motor 6 for detecting the rotational positions of the rotor of the motor 6, which position detector produces three types of different rectangular waveforms having a phase difference of 120°, each of the waveforms including rectangular alternate positive and negative portions each having a width of 180° as shown in (a) of FIG. 2. The detailed operation of the position detector 7 will not be explained here as it is well known. Numeral 8 shows a distributor for generating a gate signal 8a to fire the thyristors $S_{51}$ to $S_{56}$ of the inverter circuit 5 in predetermined sequence, which distributor 8 produces six types of different gate signals 120° in width as shown in (b) of FIG. 2, which are combinations of the detection signals 7a from the position detector 7 of (a) of FIG. 2 and inverted signals thereof. The gate signals shown in (b) of FIG. 2, for example, are applied, from upper ones to lower ones, to the thyristors $S_{51}$, $S_{52}$, $S_{53}$, $S_{54}$, $S_{55}$ and $S_{56}$ in that order. Since the inverter circuit 5 effects six commutations in one cycle of the rotation of the synchronous motor 6, the distributor 8 generates synchronizing signals 8b with 60° of intervals with each other in synchronism with the commutations of the inverter circuit 5 as shown in (c) of FIG. 2. Numeral 9 shows a continual operation command circuit, which generates a continual operation command signal 9a thereby to amplify the synchronizing signal from the distributor 8 in the manner as shown in (d) of FIG. 2, effects inversion of the rectifier circuit 3 and varies the controlled input voltage of the automatic pulse phase shifter 12 (which will be described later), thus effecting the continual flow of the DC output current. Numeral 10 shows a current difference amplifier for amplifying the difference between the "current" command concerning the magnitude of the DC output current of the rectifier circuit 3 and a current feedback signal that is the result of detecting the magnitude of AC input current of the rectifier circuit 3 by the current transformer CT, numeral 11 a drive amplifier for driving the automatic phase shifter 12 which is provided for regulating the firing phases of the thyristors included in the rectifier circuit 3 in accordance with the magnitude of the controlled input voltage from the drive amplifier 11.

In this circuit arrangement, the automatic pulse phase shifter 12, in response to the continual operation command signal 9a from the continual operation command circuit 9 supplied in synchronism with each commutation of the inverter circuit 5, acts to regulate the firing phases of the thyristors in such a manner as to effect the inverse operation of the rectifier circuit 3. As a result, the DC output current of the rectifier circuit 3 becomes continually zero in synchronism with each commutation of the inverter circuit 5 thereby to assure the commutating operation of the inverter circuit 5. Further, although not shown in the drawings, the continual operation command circuit 9 opens and the synchronous motor 6 is switched from continual to continuous controlled operations when the synchronous motor 6 reaches a speed great enough to induce in the armature winding an inverse induced voltage sufficiently high to effect commutation of the inverter circuit 5.

The reason why in the above-mentioned circuit arrangement DC excitation in transformer 2 is affected in DC way by superposition of the DC portion on the AC input current of the rectifier circuit 3 will be explained with reference to FIG. 3 which shows the case where the relation $f_L = fs/12$ is established between the frequency $fs$ of the AC power supply 1 and the operating frequency $f_L$ of the synchronous motor 6. The graph (a) shows the controlled input voltage of the automatic pulse phase shifter 12 and the commutation state of the rectifier circuit 3, the continual operation command 9a being supplied by the continual operation command circuit 9 during the time period when the controlled input voltage is negative. Also, the waveform shown by thick solid lines of the three-phase AC voltages $e_R$, $e_S$ and $e_T$ represent commutations of the thyristors $S_{31}$, $S_{32}$ and $S_{33}$ on the positive side of the rectifier circuit 3, whereas the waveform shown in thick dashed lines indicate the commutation state of the thyristors $S_{31}$, $S_{32}$ and $S_{33}$ on the negative side of the rectifier circuit 3. The graph (b) shows waveforms of DC output voltage Vd and DC output current Id of the rectifier circuit 3, and (c) to (e) waveforms of AC currents $i_R$, $i_S$ and $i_T$ input to the rectifier circuit 3.

Time T shows a half cycle of the operating frequency of the synchronous motor 6, time $t_{01}$, $t_{02}$ and $t_{03}$ the time points of commutation of the inverter circuit 5 and $T_{01}$, $T_{02}$ and $T_{03}$ time periods between the time points of commutation of the inverter circuit 5.

Figure 3:
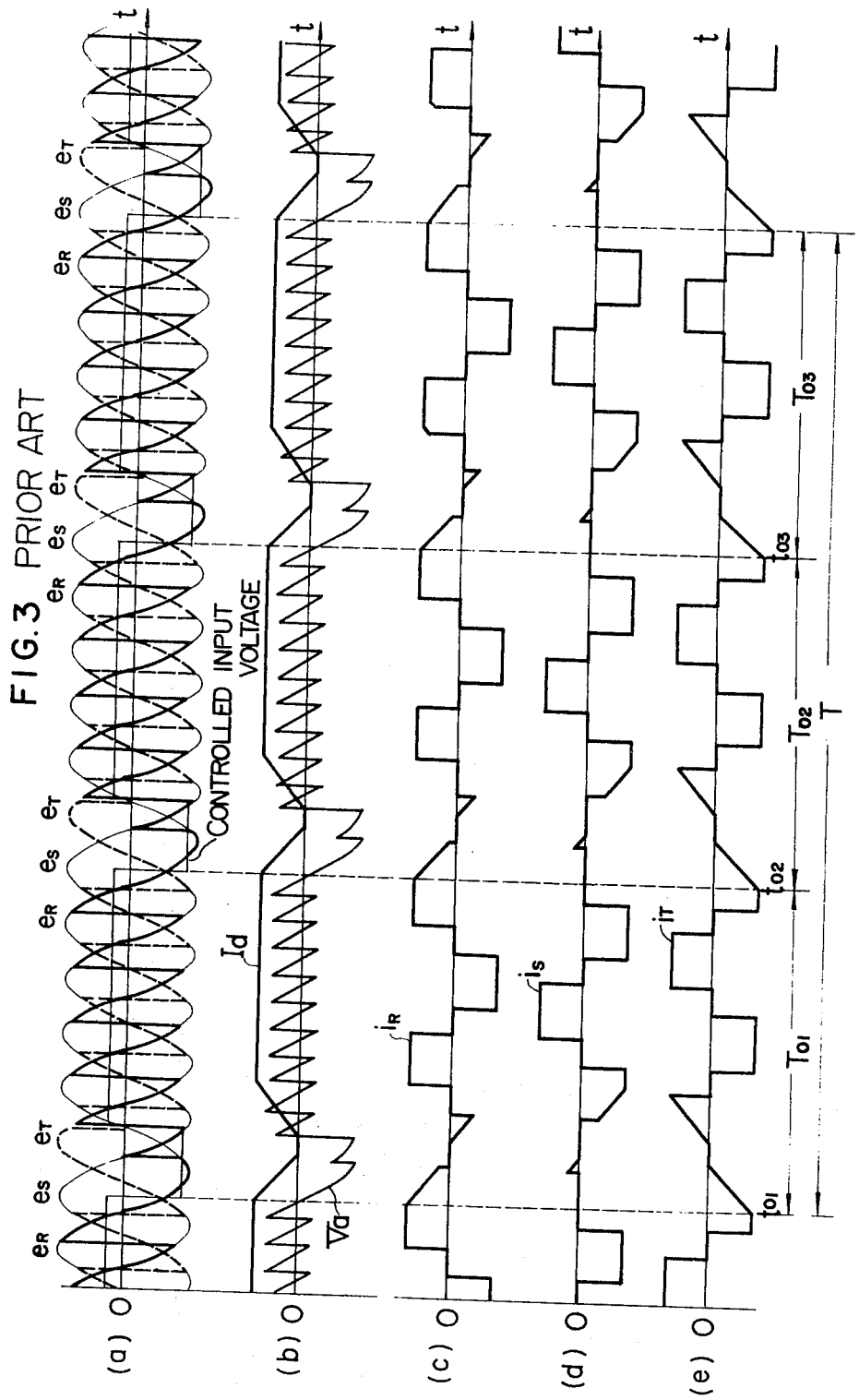

As will be obvious from the waveform of AC input current $i_R$ in (c) of FIG. 3, the AC input current $i_R$ is positive, $i_S$ zero and $i_T$ negative immediately before each commutation of the inverter circuit 5. The fact that the AC input current $i_R$ is positive means that current flows from the AC power supply 1 toward the rectifier 3 as shown by arrows in FIG. 1, while the negativeness thereof shows the current flowing in the opposite direction.

In the time period $T_{01}$, for example, the DC portion is superimposed positively on phase R, while it is superimposed on phases S and T negatively. The same can be said of the time periods $T_{02}$ and $T_{03}$ also. For this reason, DC portions are superimposed in the same direction for each phase, resulting in DC excitation in the transformer 2.

This phenomenon is attributable to the fact that the DC output current of the rectifier circuit 3 is controlled continually in step with the commutation of the inverter circuit 5 at low speeds of the synchronous motor 6. And the operating frequency $f_L$ for the synchronous motor 6 resulting from the superimposition of the DC portions on the AC input current of the rectifier circuit 3, in addition to 50/12 and 50/6 as mentioned above, is expressed as $$f_L = \frac{fs}{6 \times n} (n = 1, 2, \ldots) \qquad (1)$$

where $fs$ is the frequency of the AC power supply.

Figure 4:
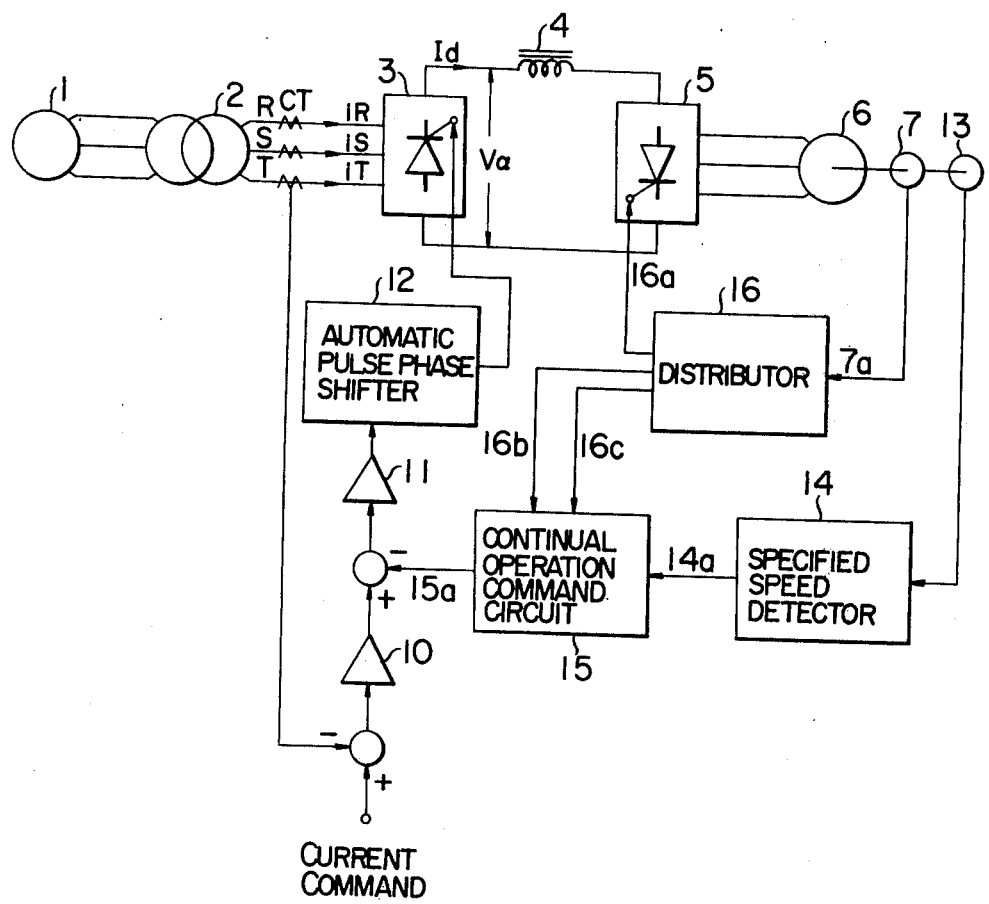
FIG. 4 is a diagram showing a circuit arrangement of a commutatorless motor according to an embodiment of the present invention.
Figure 5:
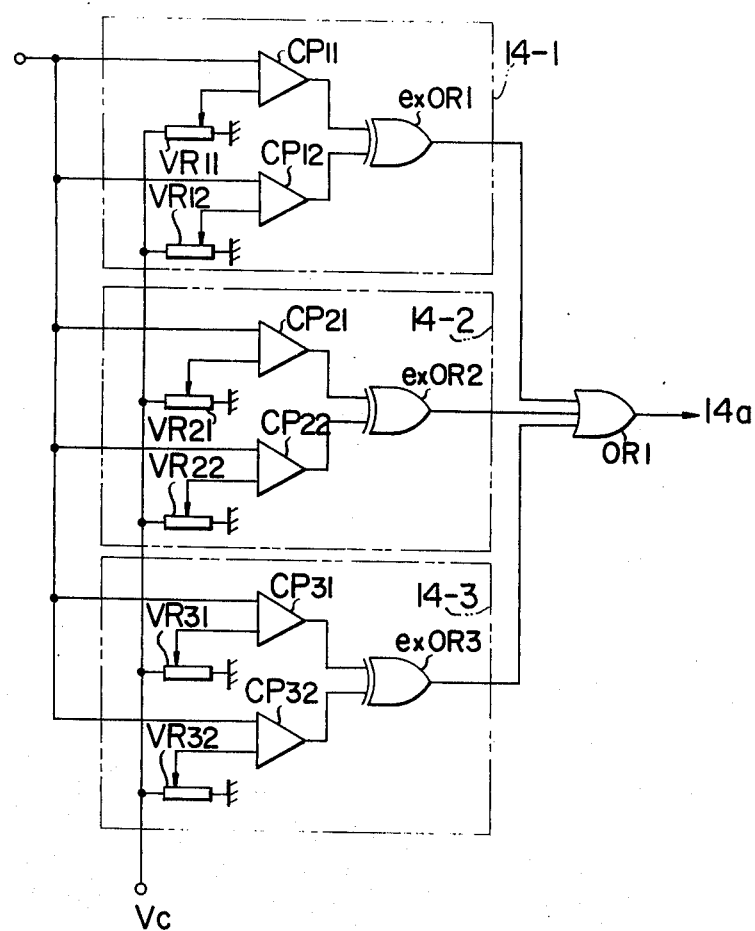
FIGS. 5 and 6 are diagrams showing in detail parts of the circuit of FIG. 4.
Figure 6:
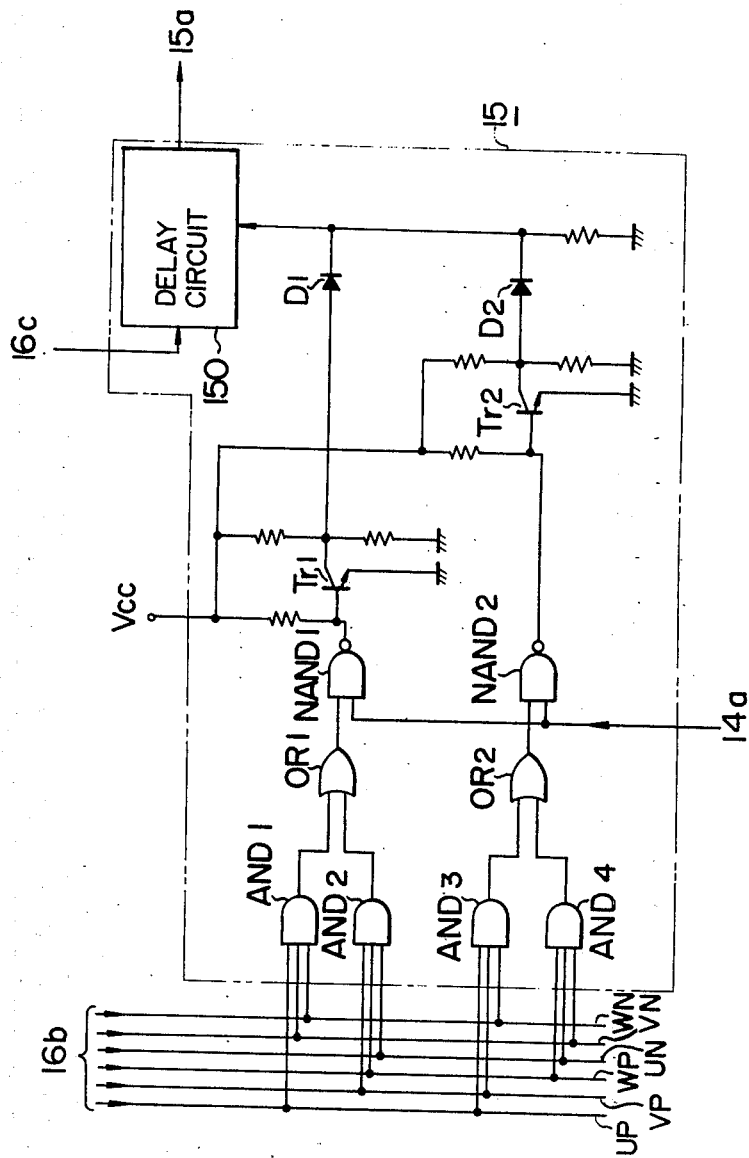
Figure 7:
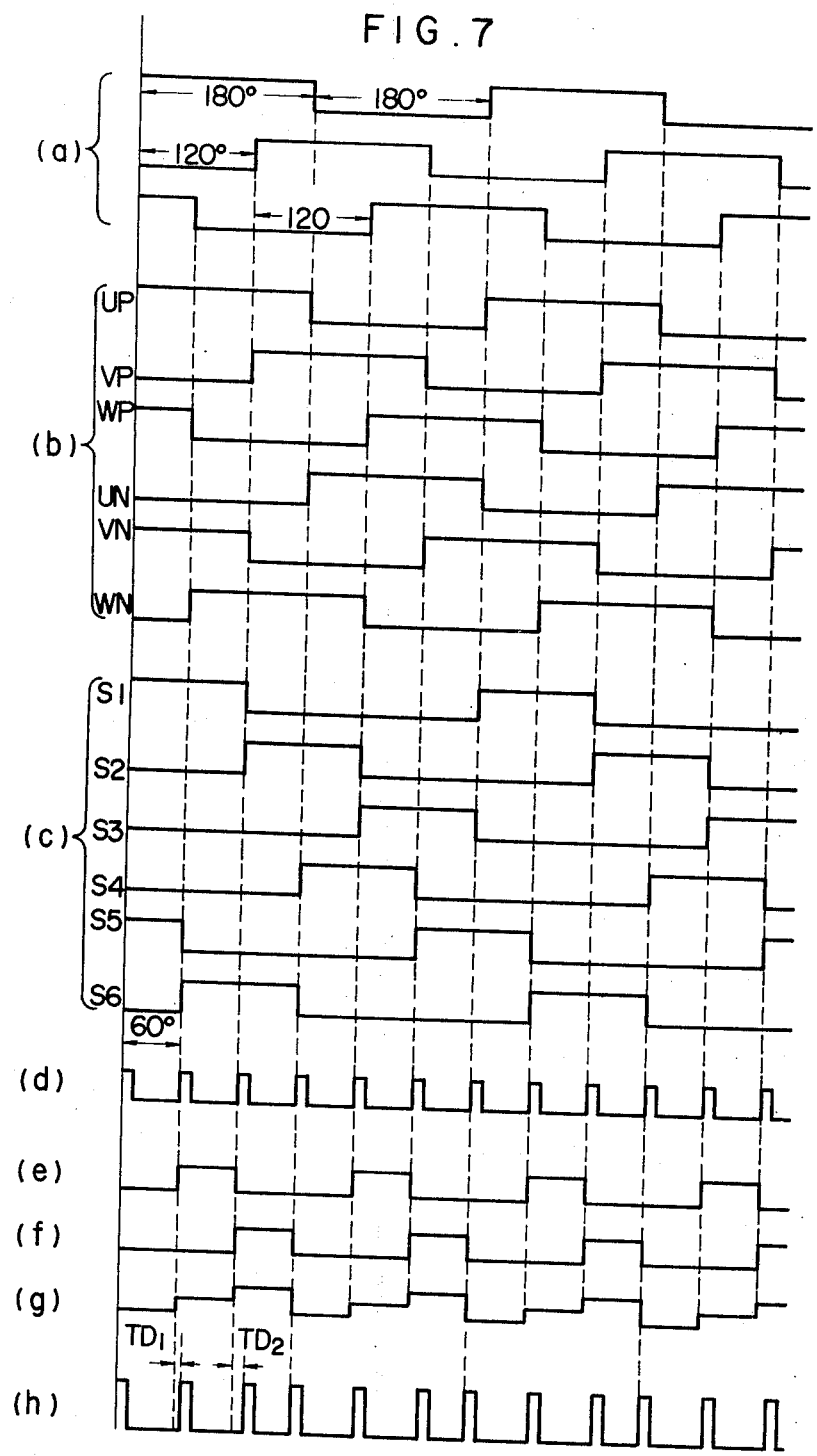
FIGS. 7 and 8 are diagrams for explaining the operation of the circuit of FIG. 4.

The present invention is intended to obviate the above-mentioned problem point and embodiments thereof are shown in FIGS. 4 to 8. Referring to FIG. 4 showing a circuit arrangement of an embodiment of the invention, the same reference numerals show the same component elements as those shown in FIG. 1. FIGS. 5 and 6 show parts of the circuit of FIG. 4 in detail, and FIG. 7 is the diagram for explaining the operation of the circuit thereof.

This embodiment will be explained fundamentally with reference to FIG. 3. In the event that a positive DC portion is superimposed on the phase R during the period $T_{01}$, the DC portion is superimposed on phase S during the next period $T_{02}$ and on phase T during the period $T_{03}$. This is achieved by differentiating the timing of the zero points of DC output current Id of the rectifier circuit 3 as relative to the timing of commutation of the inverter circuit 5, thus causing the directions of excitative effects in the transformer 2 to be offset.

In FIG. 4, the rectifier 3 is such that the AC voltage introduced from the AC power supply 1 through the transformer 2 is converted into a DC voltage related to the firing phase determined by the automatic pulse phase shifter 12. The firing phase thus determined by the automatic pulse phase shifter 12 depends on the magnitude of the controlled input voltage applied thereto. The difference between a current command and a current feedback command which is the AC input current detected by the current transformer CT in the rectifier circuit 3 is further compared with a continual operation command 15 from the continual operation command circuit 15 described later, so that the resulting error signal is applied through a drive amplifier 11 to the automatic pulse phase shifter 12 as a control input voltage. The DC output voltage from the rectifier circuit 3 is smoothed by a DC reactor and converted into an AC voltage of desired frequency by the inverter circuit 5. The output frequency of the inverter circuit 5 is applied as the operating frequency for the synchronous motor 6. The output voltage from the inverter circuit 5 forms a terminal voltage across the synchronous motor 6, so that it is driven by the frequency and voltage determined by the inverter circuit 5. The distributor 16 generates a gate signal 16a for firing the thyristors of the inverter circuit 5 in predetermined sequence in response to the detection signal 7a from the position detector 7 directly coupled to the rotary shaft of the synchronous motor 6 for detecting rotational positions. This distributor 16 operates in the same way as the distributor 8 in FIG. 1, the only difference being that in the former the output signals 16b and 16c are applied to the continual operation command circuit 15. The speed detector 13, like the position detector 7, is directly coupled to the rotary shaft of the synchronous motor 6 for generating a signal in proportion to the rotational speed of the synchronous motor 6. A specified speed detector circuit 14 which receives the output from the speed detector 13 is for detecting a specified speed of the motor at which the transformer 2 is excited in DC way by the superimposition of DC portions on the AC input currents $i_R$, $i_S$ and $i_T$ of the rectifier 3 as mentioned above.

An example of the specified speed detector circuit 14 is illustrated in detail in FIG. 5. In this figure, circuits 14-1 to 14-3 are provided for the purpose of producing output pulses when the synchronous motor 6 reaches the specified speed as shown in equation (1), the specified speed being determined by the variable resistors $VR_{11}$, $VR_{21}$ and $VR_{31}$. The width of the output pulses is determined by $VR_{12}$, $VR_{22}$ and $VR_{32}$. Reference symbols $CP_{11}$, $CP_{12}$, $CP_{21}$, $CP_{22}$, $CP_{31}$ and $CP_{32}$ show comparator circuits; comparator circuit $CP_{11}$ for making comparison between the output of the speed detector 13 and the predetermined value of the variable resistor $VR_{11}$, comparator circuit $CP_{12}$ for making comparison between the output of the speed detector 13 and the predetermined value of the variable resistor $VR_{12}$, comparator circuit $CP_{21}$ for making comparison between the output of the speed detector 13 and the predetermined value of the variable resistor $VR_{21}$, comparator circuit $CP_{22}$ for making comparison between the output of the speed detector 13 and the predetermined value of the variable resistor $VR_{22}$, comparator circuit $CP_{31}$ for making comparison between the output of the speed detector 13 and the predetermined value of the variable resistor $VR_{31}$ and comparator $CP_{32}$ for making comparison between the output of the speed detector 13 and the predetermined value of the variable resistor $VR_{32}$, all producing an output when their inputs to be compared are identical. First, an output pulse is produced from an exclusive OR circuit exOR1 of the circuit 14-1. Then the exclusive OR circuit exOR2 of the circuit 14-2 produces an output pulse, followed by the exclusive OR circuit exOR3 of the circuit 14-3 producing an output pulse. The specified speed detection pulses from these circuits 14-1 to 14-3 are applied through the OR circuits OR1 to the continual operation command circuit 15.

Even though FIG. 5 shows a case in which a specified speed is detected 3 times during the driving of the synchronous motor 6 at low speeds, the number of times of the speed detection is not limited to three.

Figure 2:
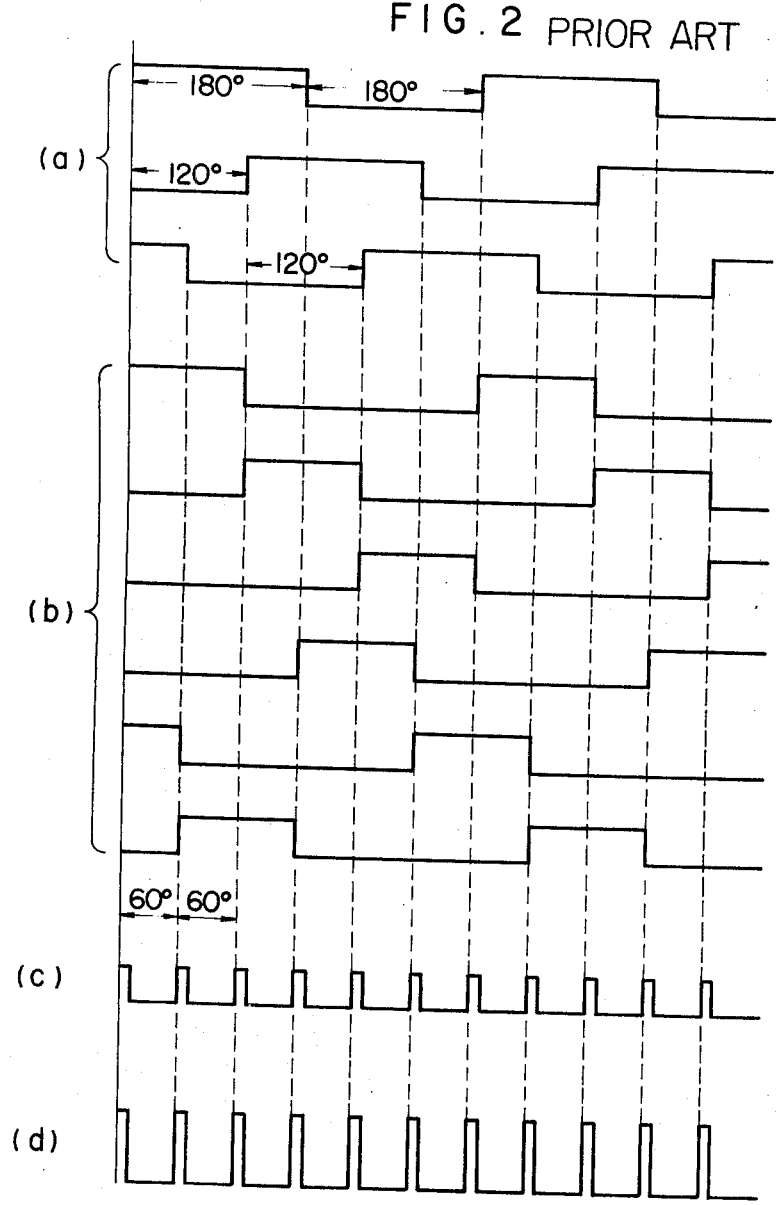
FIGS. 2 and 3 are diagrams for explaining the operation of the circuit of FIG. 1.

The continual operation command circuit 15 operates in such a manner that except at low specified speeds of the synchronous motor 6 detected by the specified speed detector circuit 14 the DC output current Id from the rectifier circuit 3 is reduced to zero continually in synchronism with the commutation of the inverter circuit 5 as in the case of FIG. 1. By this continual operation command circuit 15, the timing at which the DC output current Id of the rectifier circuit 3 is reduced to zero is delayed behind the timing of the commutation of the inverter circuit 5 during the running of the synchronous motor 6 at the specified speeds, thereby controlling the rectifier 3 so as to offset the directions of excitative effects in each phase.

An example of the continual operation command circuit 15 will be explained in detail in FIG. 6. As will be apparent from the drawing, the continual operation command circuit 15 comprises four AND circuits AND1 to AND4 for producing logical products of appropriate combinations of output signals 16b from the distributor 16, OR circuit 1 for producing a logical sum of the outputs from AND1 and AND2, an OR circuit OR2 for producing a logical sum of AND3 and AND4, a NAND circuit NAND1 for producing a logical product of the output from the specified speed detector circuit 14 and the output from OR1, a NAND circuit NAND2 for producing a logical product of the output from the specified speed detector circuit 14 and the output from OR2, a first level conversion transistor $Tr_1$ turned on and off in response to the output from NAND1, a second level conversion transistor $Tr_2$ turned on and off in response to the output from NAND2, diodes $D_1$ and $D_2$ for blocking reverse current and a delay circuit 150 for delaying the output signal 16c from the distributor 16 in accordance with the voltage level achieved through the diodes $D_1$ and $D_2$ as the result of the turning on and off of the transistors $Tr_1$ and $Tr_2$. Reference symbol Vcc shows a power supply for driving the transistors $Tr_1$ and $Tr_2$.

The operation of the circuit of FIG. 6 will be explained with reference to FIG. 7. The detection signals 7a from the position detector 7 comprise three signals with a pulse width of 180° and having phase difference of 120° as shown in (a) of FIG. 7 and identical with those shown in (a) of FIG. 2. The distributor 16, upon receipt of the three signals from the position detector 7, produces output signal groups 16a, 16b and 16c. One of these signal groups, that is, signal group 16b comprises signals UP, VP and WP identical with the detection signals from the position detector 7 shown in (a) of FIG. 7 and signals UN, VN and WN which are inversions of signals UP, VP and WP respectively, as illustrated in (b) of FIG. 7. Another signal group 16a as shown in (c) of FIG. 7 includes six signals $S_1$ to $S_6$ which are gate signals for thyristors $S_{51}$ to $S_{56}$ of the inverter circuit 5 and produced by appropriate combinations of the six signals shown in (b) of FIG. 7. The gate signal $S_1$ for the thyristor $S_{51}$, for example, results from a logical product of signals UP and VN, the gate signal $S_2$ for the thyristor $S_{52}$ from a logical product of signals VP and WN, the gate signal $S_3$ for the thyristor $S_{53}$ from a logical product of signals WP and UN, the gate signal $S_4$ for the thyristor $S_{54}$ from a logical product of signals VP and UN, the gate signal $S_5$ for thyristor $S_{55}$ from a logical product of signals WP and VN, and the gate signal $S_6$ for the thyristor $S_{56}$ from a logical product of UP and WN. The remaining output signal group 16c from the distributor 16 comprises a signal including pulses produced at 60° intervals as shown in (d) of FIG. 7 in synchronism with the commutation of the inverter circuit 5.

Thus, in response to the output signal 14a from the specified speed detector circuit 14 and signals 16b and 16c from the distributor 16, the continual operation command circuit 15 operates in the manner described below. The three signals UP, VN and WN included in the signal group 16b are applied to AND1, while AND2 operates in response to three signals VP, WP and UN, so that the output from OR1 takes the form as shown in (e) of FIG. 7. On the other hand, three signals UP, VP and WN are applied to AND3, while the signals WP, UN and VN are applied to AND4, with the result that the output from OR2 is as shown in (f) of FIG. 7.

During the period when the speed of the synchronous motor 6 is not at the specified level as mentioned above, the output signal from the specified speed detector circuit 14 is always at a low level in spite of outputs from OR1 and OR2 being applied to NAND1 and NAND2, and therefore NAND1 and NAND2 always produce an output of high level regardless of whether or not an output is produced from OR1 and OR2. The result is the fact that transistors $Tr_1$ and $Tr_2$ remain energized, so that the output signals therefrom applied through diodes $D_1$ and $D_2$ to the delay circuit 150 are 0. This causes the inoperative state of the delay circuit 150, with the result that the output signals 16c from the distributor 16 which are synchronized with the commutation of the inverter circuit 5 as shown in (d) of FIG. 7 are applied directly to the matching point at the output side of the current difference amplifier 10 as a continual operation command signal 15a. The automatic phase shifter 12, in response to the continual operation command signal 15a, regulates the firing phase of the thyristors of the rectifier circuit 3 in such a way that the inverting operation of the rectifier 3 reduces the DC output current to zero.

It will be understood from the above explanation that as long as the synchronous motor 6 runs at speeds other than the specified level, the DC output current Id from the rectifier 3 is regulated for continual energization in the same manner as in the case of FIG. 1.

When the specified level of the speed of the synchronous motor is reached, the output signal 14a from the specified speed detector circuit 14 becomes high in level and is applied to NAND1 and NAND2. Among the pulse signals in synchronism with the commutation of the inverter circuit 5 which are shown in (d) of FIG. 7, the three pulses as counted from the extreme left of the drawing that represent a half cycle of the operating frequency of the synchronous motor 6 will be explained below.

It is assumed here that the time point when the first of the three pulses is applied to the delay circuit 150 is identical with time point $t_{01}$ shown in FIG. 3. The outputs from NAND1 and NAND2 maintain the energized state of the transistors $Tr_1$ and $Tr_2$, so that the output signal applied to the delay circuit 150 is at 0 level. Thus a positive DC portion is superimposed on the AC input current $i_R$ in the same manner as during the period $T_{01}$ in FIG. 3. When at the next instant the second pulse that occurs at the time point $t_{02}$ in FIG. 3 is applied to the delay circuit 150, the signal as shown in (e) of FIG. 7 is applied to NAND1 with the result that the output of NAND1 is reduced to a low level thereby to turn off the level changing transistor $Tr_1$. This causes the delay circuit 150 to receive a command specifying the delay time $TD_1$ shown in (g) of FIG. 7, which command is assumed to be an "1-level delay time command" for the purpose of the explanation that follows. As a consequence, the delay circuit 150 produces a continual operation signal 15a after delay time $TD_1$ following the generation of a pulse of (d) of FIG. 7. This delay time $TD_1$ is provided with a view to delaying the DC output current Id of the rectifier 3 behind the timing of commutation of the inverter circuit 5 in such a manner that a positive DC portion is superimposed on the AC input current $i_S$ during the time period $T_{02}$ shown in FIG. 3.

Further, when the third pulse that is a signal occurring at time point $t_{03}$ in the graph of FIG. 3 is applied to the delay circuit 150, the signal shown in (f) of FIG. 7 is applied to NAND2 and therefore the output thereof becomes low in level, thereby turning off the level changing transistor $Tr_2$. Thus the delay circuit 150 receives a command concerning the delay time of $TD_2$, which delay time is assumed here to be a "2-level delay time command". As a result, the delay circuit 150 produces a continual operation command 15a after delay time $TD_2$ following the time of occurrence of the pulse shown in (d) of FIG. 7 as will be apparent from (h) of FIG. 7. This delay time $TD_2$ is provided for delaying the DC output current Id of the rectifier 3 behind the commutation time of the inverter circuit 5 in such a way that a positive DC portion is superimposed on the AC input current $i_T$ during the time period $T_{03}$ shown in FIG. 3.

The waveform of a voltage associated with a command issued as a result of the turning on and off of the transistors $Tr_1$ and $Tr_2$ is as shown in (g) of FIG. 7.

The above-mentioned control procedure is repeated at each half cycle of the operating frequency of the synchronous motor 6, thus enabling the offsetting of the directions of excitative effects or deflection in the transformer 2 for prevention of the DC excitative deflection therein which otherwise might occur.

Figure 8:
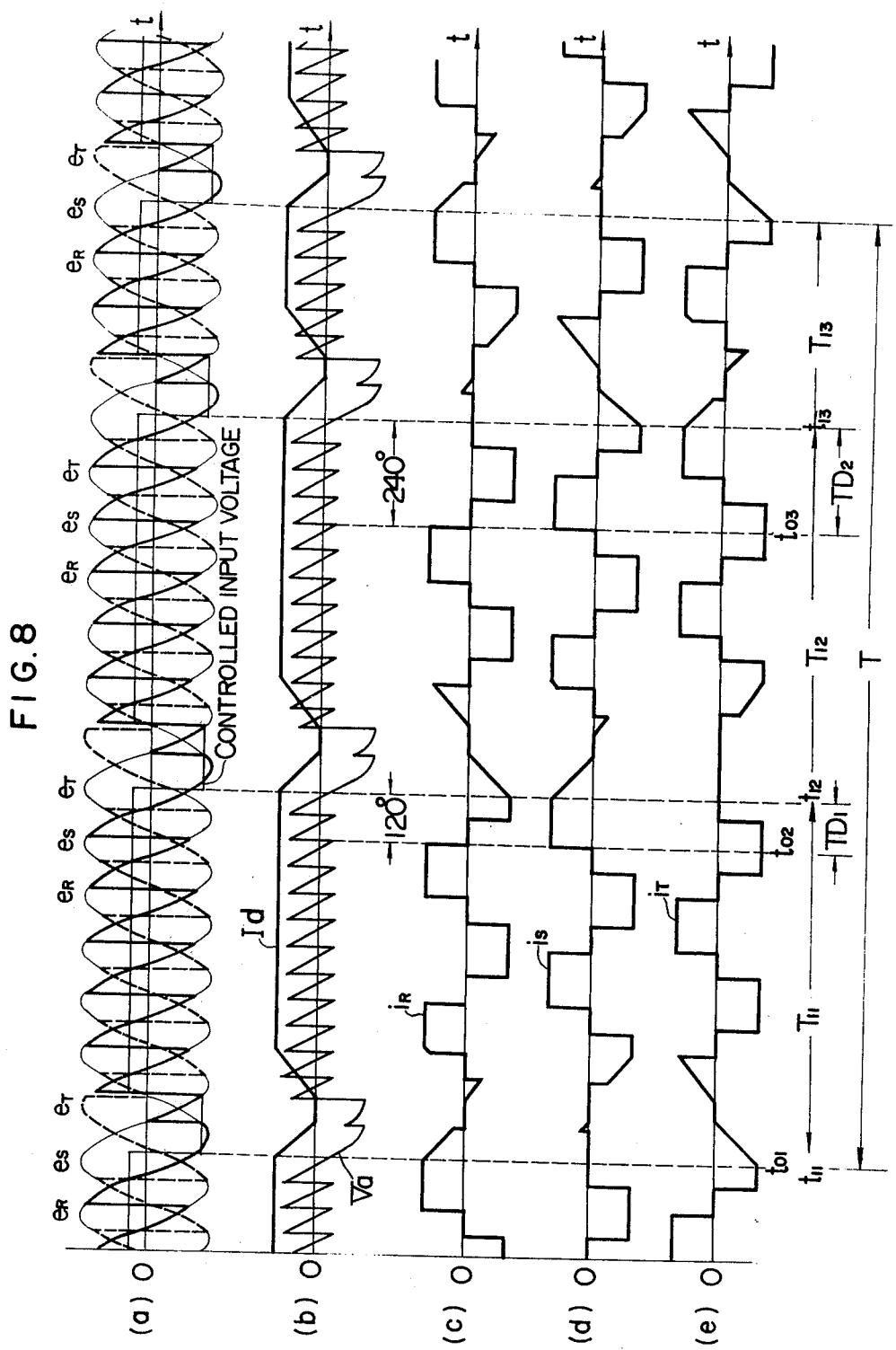

With reference to FIG. 8, explanation will be made of input and output waveforms derived from the rectifier circuit 3 in the case where the time point when the DC output current Id of the rectifier circuit 3 is reduced to zero by the continual operation command circuit 15 is delayed behind the commutation time of the inverter circuit 5. The detailed description of the diagram of FIG. 8 will not be made as it is similar to that of FIG. 3. Time point $t_{01}$ is identical with time point $t_{11}$. In view of the fact that the reduction to zero of DC output current Id of the rectifier circuit 3 at time point $t_{02}$ as shown in FIG. 3 causes the transformer 2 to be subjected to DC excitative deflection, the DC output current Id of the rectifier circuit 3 may be reduced to zero at time point $t_{12}$ after the lapse of delay time $TD_1$ from time point $t_{02}$ or behind 120° voltage phase of the AC power supply 1 where the AC input current $i_S$ of the rectifier circuit 3 is positive. This delay time $TD_1$ is realized by setting appropriately the transistor $Tr_1$. In similar fashion, time point $t_{13}$ that is the end of the delay time $TD_2$ is 240° behind the time point $t_{03}$ in the voltage phase of AC power supply 1, the delay time $TD_2$ being realizable by setting the transistor $Tr_2$ accordingly.

As a consequence, during the half cycle T of the operating frequency of the synchronous motor in FIG. 8, a positive DC portion is superimposed on the AC input current $i_R$ for the period $T_{11}$, on the AC input current $i_S$ for the period $T_{12}$ and on the AC input current $i_T$ for the period $T_{13}$, so that the directions of excitative deflection in the transformer 2 are offset with each other, thus preventing the overall excitative distortion therein.

It will be needless to say that when the speed of the synchronous motor 6 reaches a sufficient level for a commutation of the inverter circuit 5 to be effected by the induced voltage in the armature winding of the motor, the continual operation command circuit 15 is opened and thereby the automatic pulse phase shifter 12 regulates the firing phase of the thyristors of the rectifier circuit 3 in such a way as to produce a DC output current in compliance with the current command. The controlled rectifier elements of the inverter circuit 5, on the other hand, are controlled in their firing in predetermined sequence by the gate signal 16a from the distributor 16 upon application thereto of the DC output from the rectifier circuit 3 in such a manner as to produce an AC output of desired frequency.

So, the DC output current from the rectifier circuit 3 is switched from continual to continuous state.

As can be seen from the above explanation, according to the present invention, it is possible to prevent the DC excitative deflection in the transformer and hence the temperature increase thereof, thus leading to the advantage of the possibility of preventing not only the overheating of the transformer but also breakdown thereof under heat as well as generation of unwanted noises therefrom.

In spite of the fact that in the above described embodiment the timing of the reduction of DC output current Id from the rectifier circuit 3 to zero is delayed behind the commutation time of the inverter circuit 5 only when a specified speed of the synchronous motor has been reached, continual generation of the DC output current Id of the rectifier circuit 3 may be effected over the entire period of the synchronous motor running at low speeds. In the latter case, the specified speed detector circuit 14 shown in FIG. 4 is done without, thus facilitating the regulation operation of itself as compared with that required in the circuit of FIG. 4.

As will be obvious from the diagram of FIG. 8, since the number of phases of the power supply 1 is three, when considering cycles each of which consists of three of the synchronizing signals in synchronism with the commutation of the inverter circuit 5 and corresponds to the half cycle T of the operating frequency of the synchronous motor 5, in each of the cycles a positive DC portion is superimposed on the AC input currents of the rectifier circuit 3 in the order of R phase, S phase and T phase. As a consequence, such an arrangement provides a very effective means for preventing the DC excitative deflection in the transformer 2 since the alternately changing of the phase associated with the imposition of the DC portions causes the directions of excitative deflection in the transformer 2 to be offset with each other each time the DC output current Id of the rectifier circuit 3 is reduced to zero. The most important thing, however, is to prevent the imposition of the DC portions in the same direction for a prolonged time during the same phase. In view of this, one alternative solution of the problem under consideration may be to effect the imposition of DC portions in such a manner as to cover all the phases during one instead of half cycle of the operating frequency of the synchronous motor 6; or the delay time may be appropriately adjusted in predetermined cycles without regard to the operating frequency of the synchronous motor 6.

Figure 9:
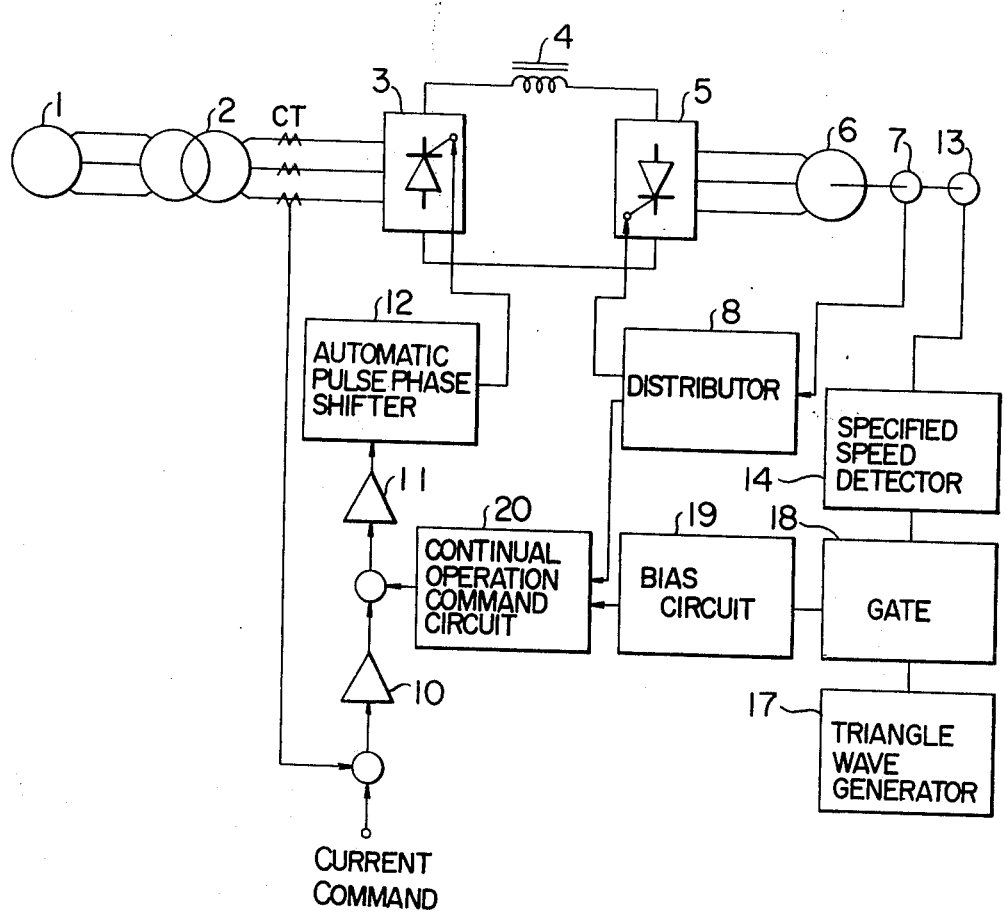
FIGS. 9 to 11 are diagrams showing other embodiments of the invention.

Another embodiment of the invention is shown in FIG. 9. In this figure, the same component elements as those shown in FIGS. 1 and 4 are denoted by the same reference numerals. In the embodiment of FIG. 9, the DC output current of the rectifier circuit 3 is reduced to zero for continual operation by appropriately differentiating the delay times during low motor speeds without regard to the operating frequency of the synchronous motor 6. Reference numeral 17 shows a triangle wave generator, numeral 18 a gate circuit, numeral 19 a bias circuit, and numeral 20 a continual operation command circuit including a delay circuit shown in FIG. 4.

Figure 10:
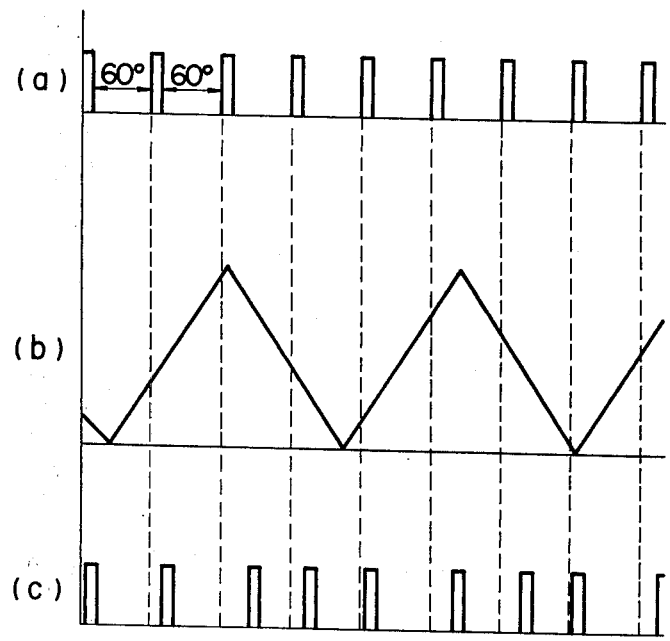

The operation of this circuit will be explained with reference to FIG. 10. When the specified speed level is detected by the specified speed detector circuit 14, the gate circuit 18 applies a triangle wave from the triangle wave generator 17 to the bias circuit 19. The triangle wave from the triangle wave generator 17 is biased by the bias circuit 19 in such a manner as shown in (b) of FIG. 10 and then applied to the continual operation command circuit 20. In accordance with each level where a train of 60° interval pulses of (a) of FIG. 10 produced by the distributor 8 at each commutation of the inverter circuit 5 intersect the triangle wave shown in (b) of FIG. 10, the continual operation command circuit 20 delays the pulses as shown in (c) of FIG. 10, so that the pulses thus delayed are applied to the matching point at the output side of the current difference amplifier 10 as a continual operation command.

In this way, the time points when the DC output current of the rectifier circuit 3 is reduced to zero are prevented from always being identical with the time points when current flows in a given phase at the secondary side of the transformer 2, thus preventing the superimposition of DC portions on the AC input current. By the way, a sine wave may be alternatively used instead of the triangle wave used above. It will be needless to say that in this embodiment also the continual regulation of the DC output current of the rectifier circuit 3 may be effected over the entire low motor speed range without regard to the specified speed level thereof.

Figure 11:
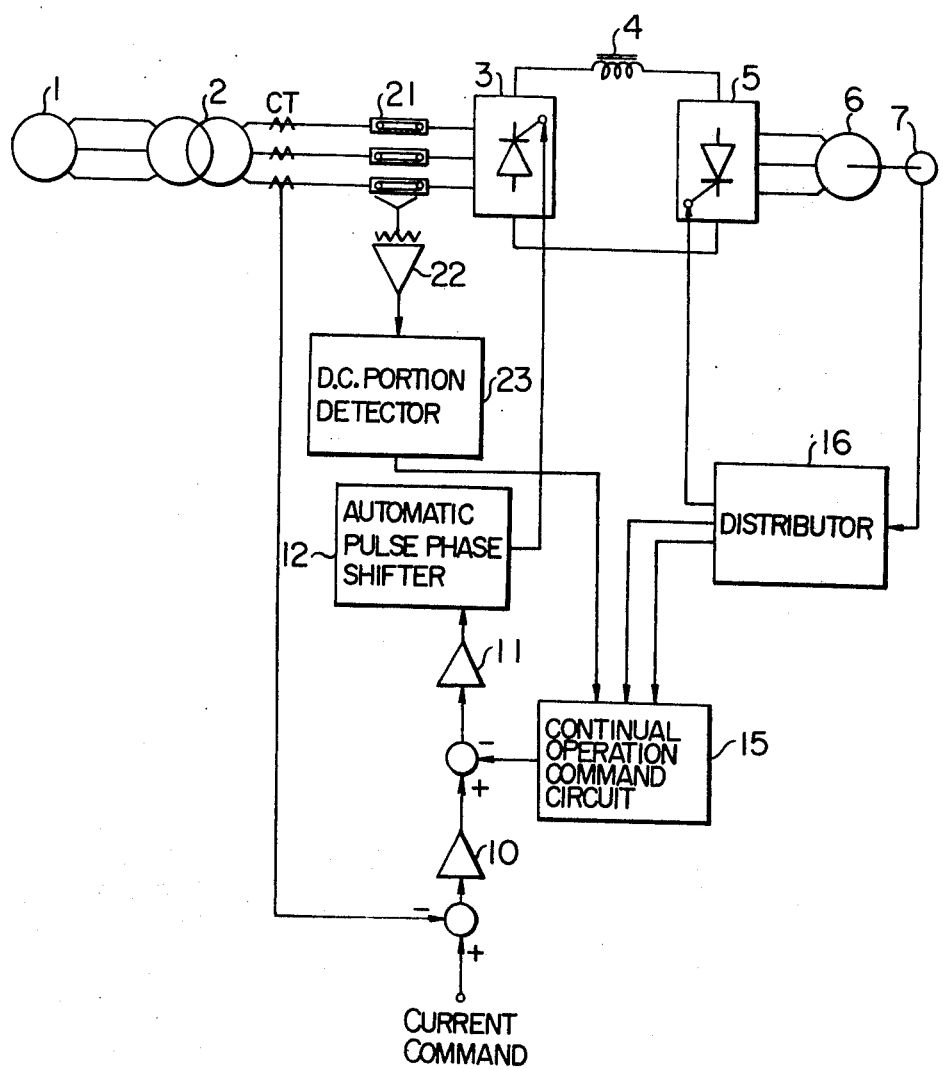

Still another embodiment of the invention will be explained with reference to FIG. 11. In the figure, reference numeral 21 shows a shunt connected to the AC input line of the rectifier circuit 3, numeral 22 an insulating amplifier for taking out an output signal proportional to the current in the AC input line of the shunt 21 by insulation thereof from the potential of the AC input line, and numeral 23 a DC portion detector for detecting a signal in proportion to the DC portion in the current flowing in the AC input line and producing an output signal of high level when the former signal exceeds a predetermined level.

The embodiment under consideration differs from the circuit shown in FIG. 4 in that in the present embodiment the specified speed detector 14 is replaced by the combination of the current divider 21, insulating amplifier 22 and DC portion detector 23, all of which cooperate in such a way that the DC portion detector 23 produces an output signal of high level when the magnitude of the DC portion included in the current in the AC input line of the rectifier 3 exceeds a certain level. As a result, as in the case where the specified speed detector 14 is involved, the delay time of the delay circuit included in the continual operation command circuit 15 is appropriately changed at operational positions where lots of the DC portions for superimposition are involved, thus making it possible to prevent the superimposition of DC portions on AC input current as desired.

In place of the current command being given as above, a speed command may alternatively be issued for speed regulation of the motor, in which case a speed difference signal may be produced separately and used as a current command.

It will be understood from the above description that the present invention is characterized in that during the period of low motor speeds where the DC output current of the rectifier circuit is to be continually regulated the turning on and off of the DC output current of the rectifier circuit is differentiated from the commutation time of the inverter circuit, so that a DC portion is superimposed on each phase of the AC input current thereby to offset the directions of DC excitative deflection in the transformer, with the result that the overheating, breakdown under heat or the generation of unwanted noises in the transformer is successfully prevented.

We claim:

1. A control system for a brushless motor comprising:
   a motor having a polyphase armature winding and a field winding;
   an inverter circuit, connected with the armature winding, comprising a plurality of thyristors and operating as a static commutator;
   a controllable rectifier circuit, connected with an A.C. power supply, for supplying D.C. current to said inverter circuit;
   first means for detecting position signals representing the rotational positions of said motor;
   second means for controlling the firing of said inverter circuit in accordance with said position signals;
   third means for controlling the firing phase of said rectifier circuit in accordance with a current command signal instructing the value of the D.C. output current of said rectifier circuit;
   fourth means for detecting that the speed of the motor is lower than a predetermined speed;
   fifth means for producing delay signals by delaying said position signals with respective different delay times when the motor speed is lower than said predetermined speed; and
   sixth means for reducing to zero the D.C. output current of said rectifier circuit in accordance with the output of said fifth means.

2. A control system for a brushless motor according to claim 1, in which said delay times are made different from each other in a cycle consisting of the same number of said position signals input to said fifth means as the number of phases of said power supply and repeated periodically every said cycle.

3. A control system for a brushless motor comprising:
   a motor having a polyphase armature winding and a field winding;
   an inverter circuit, connected with the armature winding, comprising a plurality of thyristors and operating as a static commutator;
   a controllable rectifier circuit, connected with an A.C. power supply, for supplying a D.C. current to said inverter circuit;
   first means for detecting position signals representing the rotational positions of said motor;
   second means for controlling the firing of said inverter circuit in accordance with said position signals;
   third means for controlling the firing phase of said rectifier circuit in accordance with a current command signal instructing the value of the D.C. output current of said rectifier circuit;
   fourth means for detecting that the speed of the motor reaches a specified speed;
   fifth means for producing delay signals by delaying said position signals with respective different delay times when the motor speed is said specified speed and producing signals synchronized with said position signals when the motor speed is other than said specified speed; and
   sixth means for reducing to zero the D.C. output current of said rectifier circuit in accordance with the output of said fifth means.

4. A control system for a brushless motor according to claim 3, in which said delay times are made different from each other in a cycle consisting of the same number of said position signals input to said fifth means as the number of phases of said power supply and repeated periodically every said cycle.

5. A control system for a brushless motor comprising:
   a motor having a polyphase armature winding and a field winding;
   an inverter circuit, connected with the armature winding, comprising a plurality of thyristors and operating as a static commutator;
   a controllable rectifier circuit, connected with an A.C. power supply, for supplying a D.C. current to said inverter circuit;
   first means for detecting position signals representing the rotational positions of said motor;
   second means for controlling the firing of said inverter circuit in accordance with said position signals;
   third means for controlling the firing phase of said rectifier circuit in accordance with a current command signal instructing the value of the D.C. output current of said rectifier circuit;
   fourth means for detecting a D.C. component in the A.C. input current of said rectifier circuit;
   fifth means for producing delay signals by delaying said position signals with respective different delay times when the detected D.C. component is higher than a predetermined level and producing signals synchronized with said position signals when the detected D.C. component is lower than said predetermined level; and sixth means for reducing to zero the D.C. output current of said rectifier circuit in accordance with the output of said fifth means.

* * * * *